United States Patent [19]
Wiest

[11] Patent Number: 5,505,113
[45] Date of Patent: Apr. 9, 1996

[54] HYDROSTATIC AND SYNCHRONOUS SHIFT TRANSMISSION UNIT FOR ARRANGEMENT BETWEEN A DRIVE MOTOR AND A CONSUMING DEVICE

[75] Inventor: Wolfgang Wiest, Neu-Ulm, Germany

[73] Assignee: Brueninghaus Hydromatik GmbH, Elchingen, Germany

[21] Appl. No.: 343,548

[22] PCT Filed: Jun. 22, 1993

[86] PCT No.: PCT/EP93/01593

§ 371 Date: Nov. 29, 1994

§ 102(e) Date: Nov. 29, 1994

[87] PCT Pub. No.: WO94/02758

PCT Pub. Date: Feb. 3, 1994

[30] Foreign Application Priority Data

Jul. 20, 1992 [DE] Germany ............... 42 23 846.3

[51] Int. Cl.$^6$ ............................................. F16H 47/02
[52] U.S. Cl. .................. 74/733.1; 74/731.1; 477/52; 477/68
[58] Field of Search ................. 74/730.1, 733.1, 74/731.1, 732.1; 477/52, 68; 192/53 F, 48.91

[56] References Cited

U.S. PATENT DOCUMENTS

| | | | |
|---|---|---|---|
| 4,766,779 | 8/1988 | Massy | 74/733.1 |
| 4,939,954 | 7/1990 | Walzer et al. | 477/68 |
| 4,947,687 | 8/1990 | Martini et al. | 74/733.1 |
| 4,967,610 | 11/1990 | Sasajima et al. | |
| 5,003,776 | 4/1991 | Kanai et al. | |
| 5,071,391 | 12/1991 | Kita | 475/80 |

FOREIGN PATENT DOCUMENTS

| | | |
|---|---|---|
| 0174560 | 8/1985 | European Pat. Off. |
| 1183332 | 12/1964 | Germany |
| 1294233 | 4/1969 | Germany |

*Primary Examiner*—Charles A. Marmor
*Assistant Examiner*—Sherry Estremsky
*Attorney, Agent, or Firm*—Scully, Scott, Murphy & Presser

[57] ABSTRACT

In a transmission unit (1) for arrangement between a drive motor (47) and a consuming device (48), including a hydrostatic transmission (2), adjustable by means of an adjusting device (15a, 15b), a mechanical shift transmission (4), functionally arranged downstream of the hydrostatic transmission, having a plurality of gears (5, 6), and a control device for adjusting the hydrostatic transmission (2) by means of the adjusting device (15a, 15b) for a shifting process.

The shift transmission (4) is a synchronous transmission with synchronization devices (7) for the gears (5, 6), including a device (U, V2) for the measuring or monitoring of the output drive torque (M) of the hydrostatic transmission (2) is associated with the control device (16).

In the event that before a process of gear shifting the output drive torque (M) is greater than the working moment of the associated synchronization device (7, 7a) the control device (16) sets an output drive torque (M) at the hydrostatic transmission (2) through the adjustment device (15a, 15b), which is equal to or smaller than the working moment of the synchronization device which is associated with the relevant gear (6, 7).

10 Claims, 4 Drawing Sheets

HYDROSTATIC AND SYNCHRONOUS SHIFT TRANSMISSION UNIT FOR ARRANGEMENT BETWEEN A DRIVE MOTOR AND A CONSUMING DEVICE

BACKGROUND OF THE INVENTION AND PRIOR ART

The invention relates to a transmission unit according to the preamble of claim 1.

With drives, it may be necessary for various reasons to arrange a shift transmission between the drive motor and the consuming device. One reason for this may be that the speeds of rotation desired for the consuming device differ from the output speed of rotation of a given drive motor to such an extent that a shift transmission must be provided. A further reason may be that with certain consuming devices, such as for example vehicles and more particular construction-site vehicles, particular wheel and chain drives are pre-provided, which have to be taken into consideration when selecting the drive motor. A further basic reason for the use of a shift transmission is that a shift transmission makes possible the functioning of the available drive in speed of rotation ranges favourable for the drive motor, which is in particular the case when using combustion engines, preferably Diesel engines, as drive motors. In this case it must be emphasized that in particular construction-site vehicles such as wheeled loaders, earth moving machines, excavators and the like, as well as municipal tractors and equipment carriers, are preferably driven with combustion engines, in particular Diesel engines, whereby a drive which is independent of a fixed-location source of energy is provided, which is powerful and which can be economically operated.

In particular with the aforementioned construction-site vehicles and apparatus it is likewise desired to be able to shift gear in substance without load or drive interruption, which to a large extent can be realized by means of so-called powershift transmissions.

A transmission unit of the kind as mentioned above is described in DE 34 33 495 C2 for semi-automatic gear shifting and in DE 34 33 494 C2 for automatic shifting. Each of these two transmission units comprises an adjustable hydrostatic transmission and a powershift transmission, whereby in all cases the adjustability of the hydrostatic transmission is utilized on the one hand to regulate the transmitted power by means of a power regulator and on the other hand to bring about a matching of speed of rotation, determined by the gear to be selected, for a gear shifting operation. The matching of speed of rotation occurs in the region of a coupling at the output of the hydrostatic transmission (DE 34 33 495 C2) or in the region of the coupling of the respective powershift gear (DE 34 33 495 C2), in which case the output speed of rotation of the hydrostatic transmission is adjusted in such a way that there exists speed parity at the relevant coupling, whereafter gear shifting is performed without jerking. In doing this, an alteration of the speed of rotation of the drive motor is not necessarily required, which motor is in these known configurations constituted by a combustion engine.

With the known transmission units there is great outlay inevitably involved in terms of design and also technically for the shifting. The latter results from the fact that, for a gear shift, the output speed of rotation of the hydrostatic transmission must be purposively matched to the necessary speed of rotation for the gear step. Furthermore, through this purposive matching, a considerable time is required for shifting gears. A further disadvantage with the known transmission units is based on the fact that powershift transmissions usually have multi-disc clutches, which not only are comparatively expensive to manufacture but also require a complex control and regulation technique and moreover generate a comparatively large amount of heat, which results in an unfavourable thermal balance. With the known transmission units, the efficiency and power transfer are therefore unsatisfactory.

SUMMARY OF THE INVENTION

It is the object of the invention to further develop a transmission unit of the kind mentioned in the introduction in such a way that the outlay required for gear shifting is reduced, whilst a simple and economical construction is ensured.

This object is achieved through the features of claim 1.

With the transmission unit according to the invention instead of a complex and expensive powershift transmission, there is employed an in particular mechanical locked-synchronised synchronization device with an in particular tnechanical shift transmission, which device and which transmission are available in the market as standard equipment in a plurality of variations in terms of constructional size and fields of application, and are thereby economical to obtain and moreover can also be connected in a simple way. With the transmission unit according to the invention a purposive matching of speed of rotation is superfluous for the process of gear shifting.

There occurs simply a control or regulation of the output drive torque of the hydrostatic transmission to the effect that it is equal to or smaller than the permissible transmittable power or working moment of the synchronization device of the associated gear. With the transmission unit according to the invention no purposive matching is required. Rather, it suffices when the output drive moment is equal to or smaller than the permissible transmittable working moment. For this purpose there is a comparatively large range available, so that a purposive matching is not required. The presence of a difference in speed of rotation in the synchronization device is of no significance, as the matching of speed of rotation is automatically or compulsorily effected by the synchronization device without having to be brought about purposively. For this reason, the transmission unit according to the invention can not only be more easily but also more rapidly shifted. Thereby, it has proven that the synchronization devices of a shift transmission generate less heat during operation than is usual with so-called powershift transmissions. Within the scope of the invention it is possible to regulate the output drive moment of the hydrostatic transmission in such a way that its value is always on or close to a characteristic curve representing the power limit of the synchronisation device, but this is not a requirement, as the entire output drive torque range beneath such a characteristic curve can be aimed at.

The invention is particularly suitable for drives of self-propelled vehicles with a large conversion range. Thereby a hydrostatic transmission with a closed or open circulation can be used. A special coupling, in particular between the hydrostatic transmission and the shift transmission, is not required with the invention.

With the invention it is thus achieved that the hydrostatic transmission in its loaded condition is controlled or regulated corresponding to the specific characteristics of the synchronization devices employed, whereby with a simple and economic configuration a disruption-free and rapid gear shifting is achieved, without overloading the synchronized transmission, whereby trouble-free functioning and long service life is provided.

The transmission unit according to the invention may be used for manual, semi-automatic or full automatic gear shifting, both for shifting up or shifting down. In both the latter-mentioned cases a semi- or fully automatic shifting arrangement may be provided, with an adjusting device for the hydrostatic transmission and a shifting device for the gears of the shift transmission. Such a shifting arrangement can comprise a computer or a processor, which monitors the shift criteria and initiates the shifting when the shift criteria are met. This is a matter of the permissible transmittable working moment of the synchronization devices of the shift transmission and of the output drive moment of the hydrostatic transmission, which can be determined by monitoring the load condition of the hydrostatic transmission. For this purpose a monitoring of the working pressure of the hydrostatic transmission is preferably suitable, by a pressure sensor or a pressure transducer. From the relevant pressure value the effective output drive moment can be determined or calculated, taking into account the drive setting and parameter on hand.

In each case, the permissible transferrable working moment or the power limits of the synchronisation devices of the shift transmission are known or must be determined. It is advantageous to pre-set this data in the control or regulating device of the shifting arrangement for example by storage in memory, as these data are fixed values in relation to the synchronized shift transmission at hand in each case.

In the subclaims there are features which contribute to problem-solving and make possible a satisfactory determination of the respective output drive moment of the hydrostatic transmission and its adjustment.

Thereby it must be noted that there are several possibilities for the setting of the load condition of the hydrostatic transmission. On the one hand it is possible to regulate or control the working pressure of the hydrostatic transmission by means of a suitable pressure valve in such a way that the output drive moment falls within the desired range. The latter may however also be achieved through a purposive alteration of the transmission ratio of the hydrostatic transmission. Further, with a hydrostatic transmission having several drive outputs it is also possible to partly or fully disengage at least one drive, whereby the output drive moment may also be purposively reduced.

BRIEF DESCRIPTION OF THE DRAWINGS

Below, the invention and further advantages which can be achieved thereby will be described in more detail with reference to preferred exemplary embodiments and the Figures, which show.

DESCRIPTION OF THE PREFERRED EMBODIMENT

Figure 1:
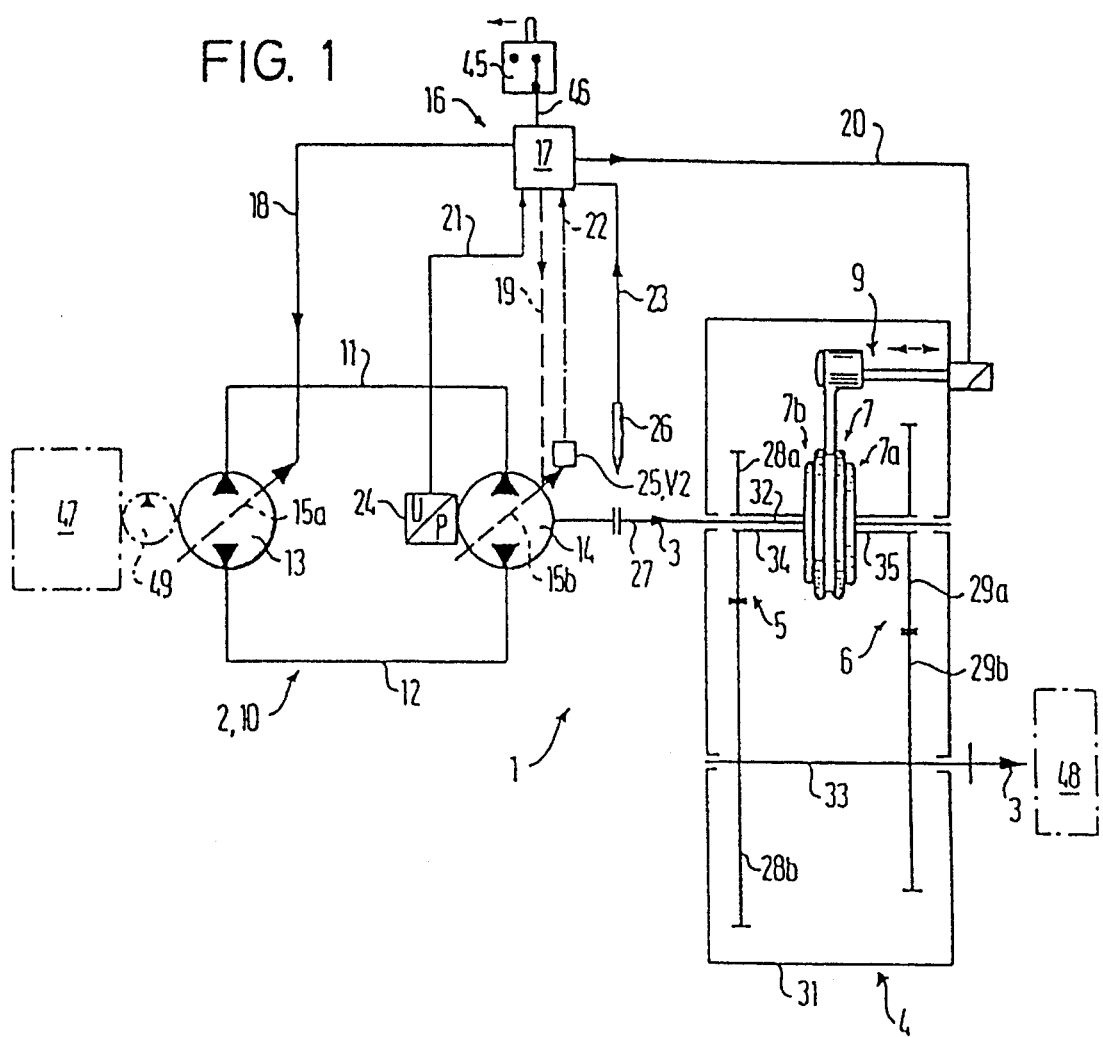
FIG. 1 an electrical/hydraulic control plan for a transmission unit according to the invention, with an adjustable hydrostatic transmission and a synchronized shift transmission connected downstream thereof.
Figure 2:
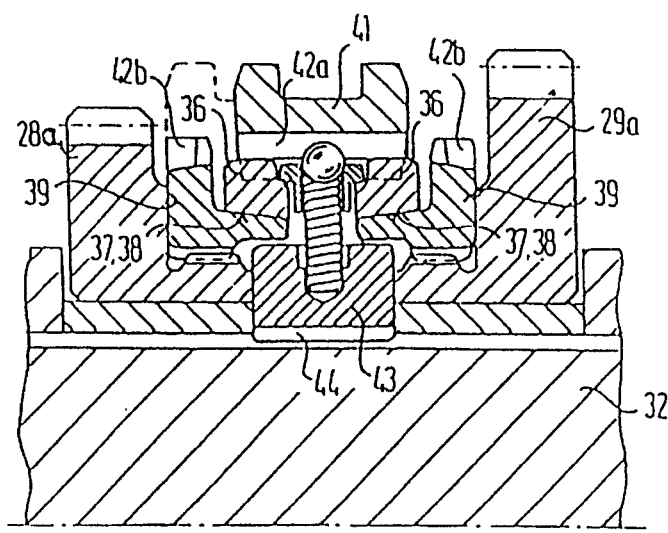
FIG. 2 a synchronization device for a gear of the shift transmission.

The transmission unit 1 comprises an adjustable hydrostatic transmission 2 and a mechanically synchronized and thus compulsorily functioning shift transmission 4 arranged downstream thereof in the direction of power transmission (arrow 3) with two gears, namely a first gear 5 and a second gear 6—a reverse gear may also be provided, which is not shown for reasons of simplification. A synchronization device 7 is associated with the gears 5, 6 with respective clutch rings 7a, 7b. For shifting the gears 5, 6 a e.g. mechanically and/or electrically functioning shifting device 9 is associated with the shift transmission 4, which acts upon the gears 5, 6 via the synchronization device 7.

The hydrostatic transmission 2 has, in the present embodiment, a closed circuit 10 with a pressure line 11 and a low-pressure line 12, between which a hydraulic pump 13 is connected on the input side and a hydraulic motor 14 is connected on the output side in the usual way. At least one of these two hydraulic parts (pump 13 or motor 14) is adjustable with regard to its working or through-put volume. With the present embodiment the hydraulic pump 13 and the hydraulic motor 14 are respectively adjustable by means of regulating devices 15a and 15b. For the regulation or control of the transmission unit 1 there serves a regulation or control device 16, which performs the necessary gear shifts either semi- or fully automatically in accordance with certain functional criteria.

The control device 16 comprises an in particular electronic control apparatus 17, preferably with a microprocessor, which is connected with the adjusting devices 15a, 15b and with the shift device 9 through control lines 18, 19, 20 and with specific function transmitters of the transmission unit 1 through signal lines 21, 22, 23. The signal line 21 connects the control apparatus 17 with a pressure transducer 24, which detects the working pressure of the hydrostatic transmission 2 in a way known per se (pressure p) and transforms it into an electrical signal (voltage U or current I) which represents a measurement parameter for the working pressure. The signal line 22 connects the control device 17 with one of the two adjusting devices, in this case with the adjusting device 15b, the latter being assigned a displacement or tilt angle measurement device 25, which produces a signal V2 which is proportional to the displacement or the present tilt angle or the present through-put volume in the hydraulic motor 14, which together with the signal U or I provides determinant parameters for the working moment M of the hydrostatic transmission 2 or for the power (power N=pressure p×through-put volume V2) transmitted thereby. The signal line 23 connects the control apparatus 17 with a speed-of-rotation meter 26, which rests on the shaft 27 connecting the hydrostatic transmission 2 with the shift transmission 4 and produces a signal n, which corresponds to the output drive speed of rotation of the hydrostatic transmission and which can be fed to the control apparatus 17 by means of the signal line 23. The control line 19 and the signal line 22 are indicated by broken lines and thus only schematically represented, as they need not always be present, e.g. if only the hydraulic pump 13 is adjustable. In such a case the pressure transducer 24 may be assigned to the hydraulic pump 13 or the pressure line 11 or the low pressure line 12 in order to be able to detect the pressure present in each case. With the present embodiment the adjusting devices 15a, 15b are adjustable beyond their zero position, whereby the direction of rotation of the hydrostatic transmission 2 can be reversed and the pressure side also changes.

The shift transmission 4 comprises two toothed-wheel pairs 28a, 28b, and 29a, 29b, which form respective gears 5, 6 and which are mounted on two mutually parallel shafts 32, 33 rotatably mounted in the shift transmission housing 31, of which the shaft 32 is connected with the hydraulic motor 14 as an input shaft, whereas the shaft 33 is an output shaft.

The toothed-wheels 28a, 29a are carried on the input shaft 32 by means of hollow shafts 34, 35. The synchronization device 7, associated with each respective gear 5, 6 or with both gears, can be of conventional construction. With the present embodiment respective clutch rings 36 are provided, the come surface 37 of the clutch ring cooperating with the cone surface 38 of a clutch drive ring 39 which is indirectly connected with the associated toothed-wheel 28a, 29a. The two clutch rings 36 have associated therewith a common function ring 41 approximately in the middle, which is displaceable by means of the shifting device 9, via e.g. a rod which engages into an annular groove, relative to the associated clutch ring 36 and clutch drive ring 39, the function ring 41 acting axially upon the corresponding clutch ring 36 and cooperating with the corresponding clutch drive ring 39 by means of specially formed coupling elements 42a, 42b. The function ring 41 coaxially surrounds a middle tapered ring 43, which is fixedly connected with the input shaft 32 by means of a key groove connection 44. In the (indicated) displacement position of the function ring 41, which is leftwardly displaced, the first gear 5 is selected, whereas in the rightwardly displaced displacement position of the function ring 41 the second gear 6 is selected. In the middle position of the function ring 41 free-running is possible. With the control device 16 there is associated a selector switch 45, connected by means of an elective connection, e.g. a signal line 46, with the control apparatus 17. At the selector switch 45 the desired gear shift can be manually preselected or initiated.

The transmission unit 1 is intended for arrangement between a drive motor 47—which is preferably a combustion engine, in particular a Diesel engine, and which is connected with the hydraulic pump 13 - and a consuming device 48, which is connected with the output shaft 33 of the shift transmission 4. The transmission unit 1 according to the invention is suited, in particular with a drive motor in the form of a combustion engine, preferably a Diesel engine, as a travel drive for vehicles, in particular construction-site vehicles. A transmission arrangement which functions well, and is robust and efficient is achieved, which to a large extent makes possible a disruption free shifting even under load conditions. An auxiliary pump 49 may be arranged between the indicated drive motor 47 and the hydrostatic transmission 2, which pump provides a control pressure, which may serve for the hydraulic control of displacement or shifting functions, e.g. control of the displacement devices 15a, 15b by means of suitable hydraulic control elements.

The functioning of the transmission unit 1 including the control device 16 will be described below with reference to a shifting operation. With semi-automatic operation a gear shift is initiated through actuation of the selector switch 45, in which case the gear shifting can either take place immediately or—insofar as a speed-of-rotation detector 26 is provided—the gear shifting is performed only when a speed of rotation is present at which a shifting is reasonable and a favourable speed-of-rotation range is provided for the drive motor 47.

Immediately before performing the shift, the control apparatus 17, which has a monitoring function, determines by means of the signals U or I and V2 whether the output torque M of the hydrostatic transmission 2 is greater than the permissible transmittable working moment of the associated synchronisation device 7. If this output drive torque M is equal to or smaller than the working moment, shifting into a higher or lower gear can immediately be performed. If, however, the output drive torque M is greater than the working moment, the adjusting device 15b of the hydraulic motor 14 is displaced in the direction of smaller through-put volume, i.e. is tilted backwards, until the output drive torque V2 is equal to or smaller than the working moment. A control process or a regulation process may serve for carrying out such an output drive torque reduction. During the process the drive torque M may be controlled in such a way that it is always on the power limit of the associated synchronization device 7, or an imaginary characteristic line which lies below the power limit can be aimed at or regulated for. Such a characteristic line, e.g. the power limit, can be stored in a memory of the electronic control apparatus 17. The definition of such a characteristic line is not difficult to determine in accordance with the available known performance data of the synchronization device. In any case the gear shift is initiated or performed when the output drive moment is on or below the power limit N, i.e. lies in the region S.

In the above-described embodiment the transmission ratio of the hydrostatic transmission 2 is changed or increased by adjusting the hydraulic motor 14 for the purpose of reducing the output drive torque M. This is favourable, as such an adjustment enables a direct influence on the output drive torque M. The output speed of rotation of the hydrostatic transmission 2 increases, but this is not significant because—as has been explained above—no associated speed matching need be taken into account, insofar as a matching of speed of rotation of two rotating parts to be connected with each other—in the present case of the associated synchronization device—is reached. With the embodiment according to the invention this matching of speeds of rotation is automatically and compulsorily carried out by the synchronization device 7. Within the scope of the invention it is also possible to reduce the output drive torque M, by de-loading the hydrostatic transmission 2, to such an extent that the output drive torque is equal to or smaller than the working moment of the synchronization device 7. Such a de-loading can be achieved by means of an adjustment of the hydraulic pump 13 by means of its associated adjustment device 15a in the direction of smaller through-put volume.

Figure 3:
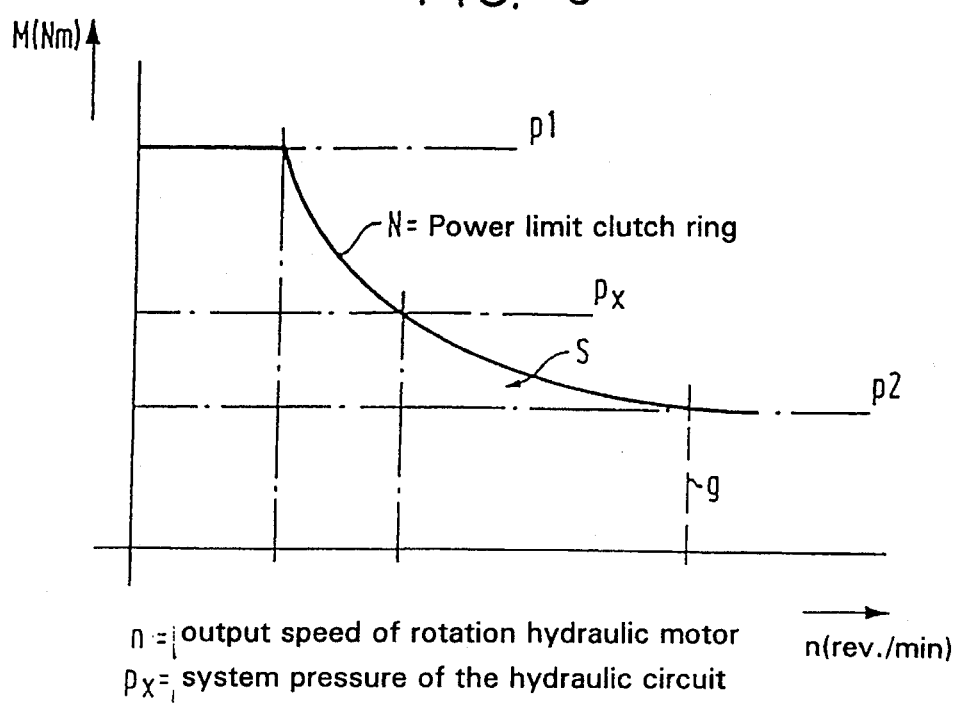
FIG. 3 and 4 respective diagrams indicating the power limit of a clutch ring of the synchronization device.
Figure 4:
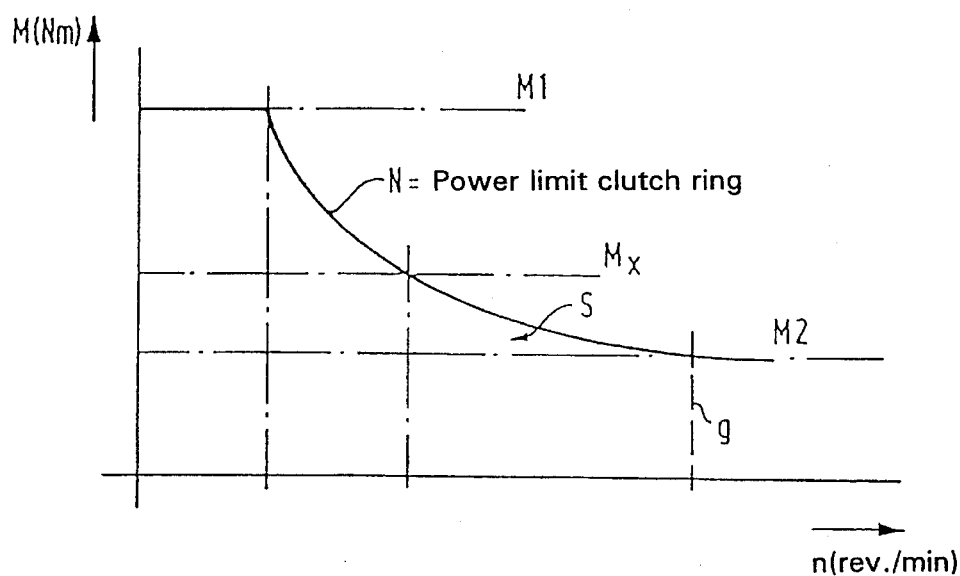

In FIGS. 3 and 4 the power limit of the synchronization device 7 is shown in a coordinate system as a curve N, the output drive speed of rotation n of the hydraulic motor 14 being indicated on the ordinate and the output drive torque M being indicated on the abscissa. In contrast to FIG. 3, where the curve of the power limit of the associated clutch ring 36 is indicated in comparison with a minimal working pressure p1 and a maximal working pressure p2, in FIG. 4 the curve of the power limit of the clutch ring 36 is indicated with reference to the minimal torque M1 and the maximal torque M2. Moreover, in FIG. 3 the system pressure of the hydraulic circuit is designated as $P_x$, whereas in FIG. 4 the tractive moment of the adjustable hydraulic motor 14 is designated with $M_x$. In both Figures the delivery limit of the hydraulic motor 14 is designated by g. It is advantageous to associate a pressure control with the hydraulic circuit which at least in a part range sets a constant or a variable working pressure. With such a configuration on the one hand it is ensured that the working pressure does not fall below a predetermined value and therefore does not have to be built up again in the case of a subsequent acceleration. On the other hand pressure increases, occurring for a variety of reasons, which might impair the shifting or also the vehicle handling, are compensated by pressure control.

Below, further functional details and advantages will be described. With the embodiment according to the invention shifting is made possible at any desired moment. Pressure or speed of rotation values of the hydrostatic transmission are not unavoidably necessary as shift points. Various strategies are possible for performing a gear shift operation within the power datum points of the synchronization device 7.

1. Output drive torque reduction of the hydraulic motor shaft with zero positioning hydraulic motor By using a hydraulic motor 14 which can be tilted to a tilt angle=approx. 0° and displacement volume of approx. 0 cm$^3$/rev, there is possible a reduction to an output drive moment which corresponds to the tractive moment of the drive mechanism of the hydraulic motor. As output speed of rotation there result, in the reduced load condition, values which are predetermined by the wheels and the mechanical transmission. The pressure level of the hydrostatic transmission will remain largely unchanged.

In this driving condition one of the clutch rings is released while the other is engaged. The matching of speed of rotation which is required on account of the mechanical ratio change is effected by the other mechanical clutch ring in a load-reduced condition. After frictional engagement of the other clutch ring any desired moment increase may be effected through a tilting out of the hydraulic motor 14 in the direction of larger tilt angle. This shifting function can also be performed from the second to the first gear. With this gear shifting strategy the utilisation of an adjustable pump 13 is not absolutely necessary. The shifting function can also be obtained with a constant pump and zero positioning adjustable motor.

Output drive moment reduction of the hydraulic motor shaft through pressure regulation. Synchronization devices 7 have power limits which correspond to an analogous system pressure of the hydrostatic transmission. The hydrostatic transmission 2 is regulated towards this required pressure level when a shifting process is desired.

In this gear shifting strategy an adjustable hydraulic motor 14 is not required. Below the power limits N of the synchronization device 7, a correction of the predetermined pump setting is not necessary. If the necessary system pressure level is achieved by means of the pressure regulation of the adjustable pump 13, which can be monitored e.g. by means of a pressure transducer as actual value supplier, the shifting operation proceeds as described under 1. The moment build up at the motor output drive shaft 27 is achieved by increasing the system pressure by means of the pressure regulation.

With the gear shifting strategies as described in points 1 and 2, multi-speed mechanical gear boxes equipped with synchronization devices and with hydrostatic drives may be shifted whilst travelling. Here, during the shifting phase, a short-term moment or tractive force interruption exists.

Figure 5:
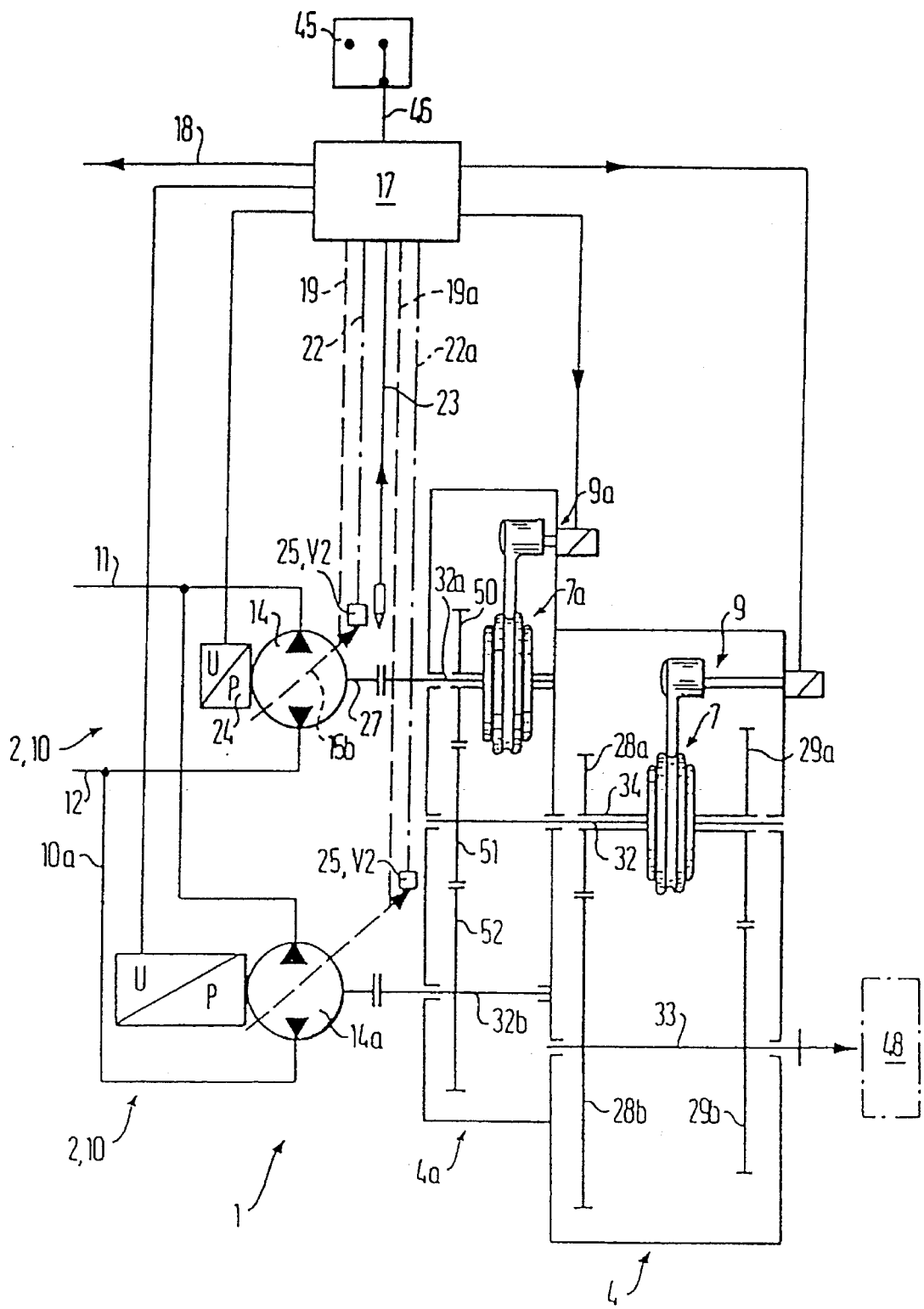
FIG. 5 an electrical/hydraulic control plan for a transmission unit according to the invention in a modified configuration as summatmon transmission.
Figure 6:
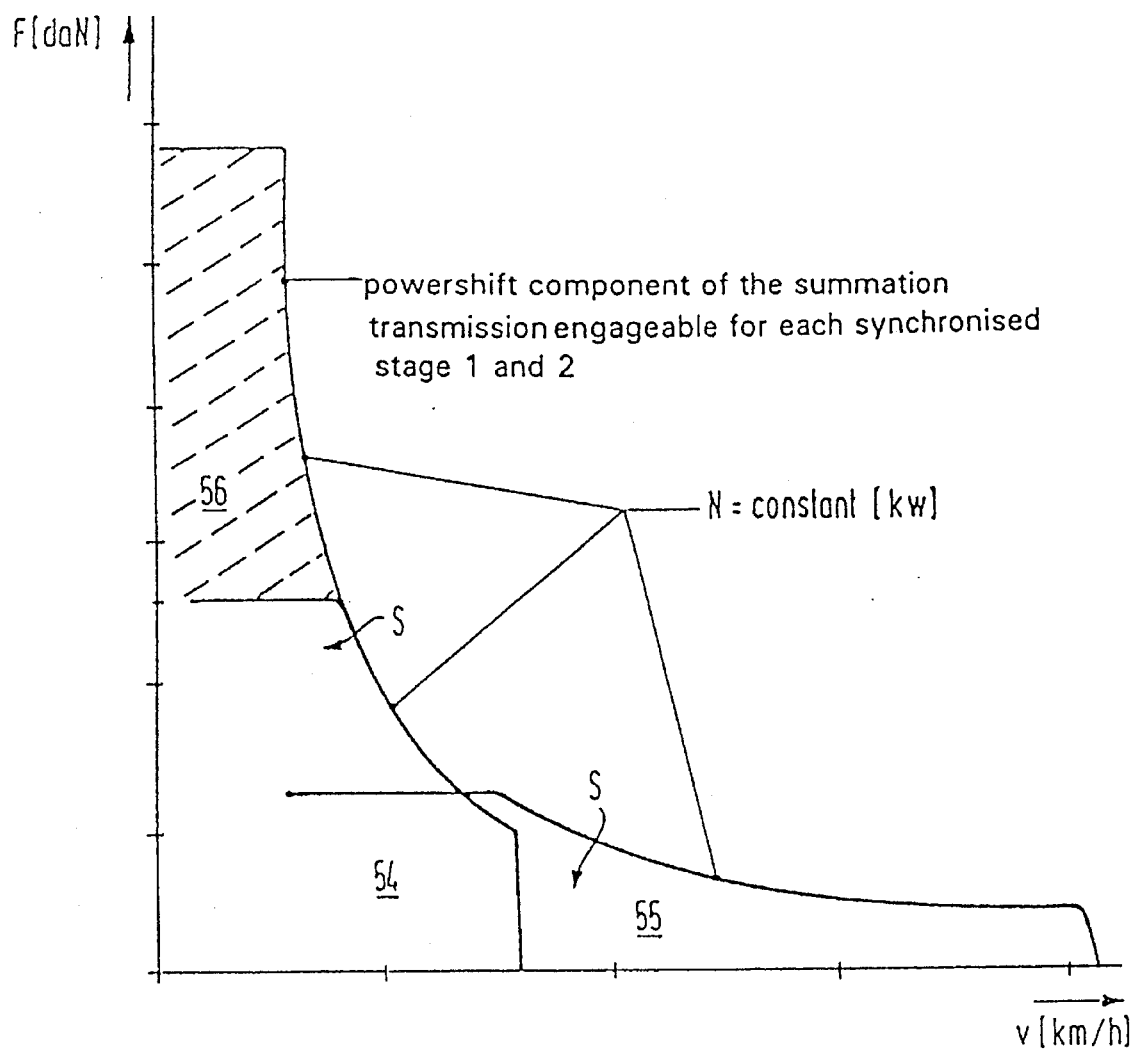
FIG. 6 a basic tractive force diagram of the transmission unit with synchronized gears and with a drive train 56 in the summation transmission which can be engaged or disengaged with the help of a further synchronization device.

The utilisation of this shifting technology for summation transmissions makes it possible—as is shown in FIGS. 5 and 6, to connect a load stage upstream of each shifting stage. With summation transmissions it is expedient to proceed in accordance with point 2 in connection with a zero positioning motor.

With the exemplary embodiment according to FIG. 5, where similar or comparable parts are provided with similar or corresponding reference signs, the shift transmission unit 1 is formed in the sense of a so-called summation transmission. The hydraulic circuit 10 has a parallel power section 10a, in which a further hydraulic motor 14a is arranged, which can be either a constant motor or an adjustable motor, which is connected with the control apparatus 17 through a control line 19a and a signal line 22a in the above-described manner. A transmission section 4a with two parallel shafts 32a, 32b and the forwardly elongated shaft 32, which are connected with each other by means of toothed-wheels 50, 51, 52, is associated with the shift transmission 4. By this means a transmission branch is created, which may be selectively engaged. On the input shaft 32a a further synchronisation device 7a is arranged in correspondence with the above-described exemplary embodiment, which serves for the engagement and synchronization of the transmission branch and is effective in one direction. The transmission branch forms a synchronized load stage for the synchronised transmission 4. This variant makes it possible to reduce the output drive torque M by putting part of the output drive torque, in this case that of the hydraulic motor 14, out of action by interrupting the drive connection between the hydraulic motor 14 and the shift transmission 4, which may be performed selectively by means of the synchronisation device 7a. With this embodiment the working moment of the synchronisation device 7a is also taken into account when engaging the hydraulic motor 14, namely by setting its output moment—by adjusting the hydraulic motor 14 in the direction of smaller through-put volume—in such a way that the output moment lies below the power limit of the associated synchronisation device 7a.

Insofar as the hydraulic motor 14a is a constant motor, it can be designed in such a way that the output drive torque transmitted thereby is always smaller than the working moment of the synchronisation device 7, i.e. after disengagement of the hydraulic motor 14 the desired gear may be selected immediately.

FIG. 6 shows the example of transmission delivery at a constant power N with the synchronization stages 54, 55 of the synchronization devices 7, 7a in a coordinate system, on whose ordinate the speed and on whose abscissa the drive force is marked. The powershift component of the summation transmission is designated as 56.

Further advantages:

The driving ranges or gears are shiftable during travel by means of the synchronized transmission 4.

Every synchronized driving range 5, 6 has a powershift stage.

Favourable thermal balance on account of clutch rings.

Simple matching of speed of rotation by means of clutch rings.

Utilisation of standard transmissions possible, thus economical.

High conversion range with favourable hydraulic motor sizes a) hydrostatic conversion range up to approx. 12:1 with favourable efficiency b) with two-stage synchronised transmissions up to approx. 40:1 with normal maximum ratio differences.

Possible reduction of the shift transmission to 2-stages through powershift function of the summation transmission.

Utilization of pre-controlled hydraulic units, thereby following advantages:
a) controlled vehicle handling, since high-pressure independent
b) by means of microprocessor any desired programs are possible With standard design by means of powershift function a considerable, possibly even a double tractive force increase is possible.

Easy towing is possible.

Transmission based on modular assembly system possible
a) basic configuration, 2-stage synchronised shift transmission,
b) simple enhancement by powershift stage in each transmission stage with variation
2×adjustable motor
1×adjustable motor and 1×constant motor With zero positioning motor no fixed losses, since disengagement is possible via the synchronization device 7, 7a (efficiency).

Relatively simple control strategy.

I claim:

1. Transmission unit (1) for arrangement between a drive motor (47) and a consuming device (48), comprising a hydrostatic transmission (2), having a hydraulic motor and a hydraulic pump adjustable by means of an adjusting device (15a, 15b), a mechanical shift transmission (4), functionally arranged downstream of the hydrostatic transmission, having a plurality of gears (5, 6), and a control device for adjusting the hydrostatic transmission (2) by means of the adjusting device (15a, 15b) for a shifting process, characterised in that, the shift transmission (4) is a synchronous transmission with synchronization devices (7, 7a) for the gears (5, 6), in that, a device (U, V2) for the measuring or monitoring of the output drive torque (M) of the hydrostatic transmission (2) is associated with the control device (16), and in that, in the event that before a process of gear shifting the output drive torque (M) is greater than the working moment of the associated synchronization device (7, 7a) the control device (16) sets an output drive torque (M) at the hydrostatic transmission (2) by means of the adjusting device (15a, 15b), which is equal to or smaller than the working moment of the synchronization device which is associated with the relevant gear (6, 7).

2. Transmission unit according to claim 1, characterised in that, the device for measuring or monitoring the output drive torque (M) has a pressure sensor for determining the working pressure of the hydrostatic transmission, which sensor generates a corresponding control signal for the control device (16).

3. Transmission unit according to claims 1 or 2, characterised in that, the device for measuring or monitoring the output drive torque (M) comprises a measuring device for determination of the circulation volume or the through-put volume (V2) in the hydraulic motor (14), which generates a corresponding control signal for the control device (16).

4. Transmission unit according to claim 1, characterised in that the hydraulic pump (13) and/or the hydraulic motor (14) are respectively adjustable by means of the adjusting devices (15a, 15b).

5. Transmission unit according to claim 4, characterised in that, the measuring device is a displacement or displacement angle detecting device (25) for detecting the displacement or displacement angle.

6. Transmission unit according to claim 1, characterised in that, a speed of rotation detector (26), for detecting the drive output speed of rotation of the hydrostatic transmission (2) or a corresponding speed of rotation, is provided which generates a control signal for the control device (16).

7. Transmission unit according to claim 6, characterised in that, a semi- or fully automatic, electronic control device (16, 17) is provided, which is connected with the adjusting device or devices (15a, 15b), the pressure sensor, the measuring device for the through-put volume, the speed of rotation detector and/or a shifting device (9) for the shift transmission (4), by means of control or signal connections.

8. Transmission unit according to claim 1, characterised in that the adjusting device (15a, 15b) for the hydraulic pump (13) and/or the hydraulic motor (14) has associated therewith a respective pressure regulator which sets such a working pressure in the hydrostatic transmission (2) that its output drive moment (11) is equal to or smaller than the working moment of the corresponding synchronization device (7, 7a).

9. Transmission unit according to claim 1, characterised in that the hydrostatic transmission (2) comprises a plurality of hydraulic motors (14, 14a) in the form of constant motors and/or adjustable motors, whereby part of the hydraulic motors 41 can be selectively disengaged.

10. Transmission unit according to claim 9, characterised in that in the transmission connection between the one hydraulic motor (14) and the shift transmission (4) a disengageable transmission connection is provided, with a mechanical synchronization device (7a) in the form of a selectable gear.

* * * * *